Jan. 20, 1959     C. S. HOFFMAN     2,869,670
INTAKE SILENCER
Filed Oct. 1, 1956
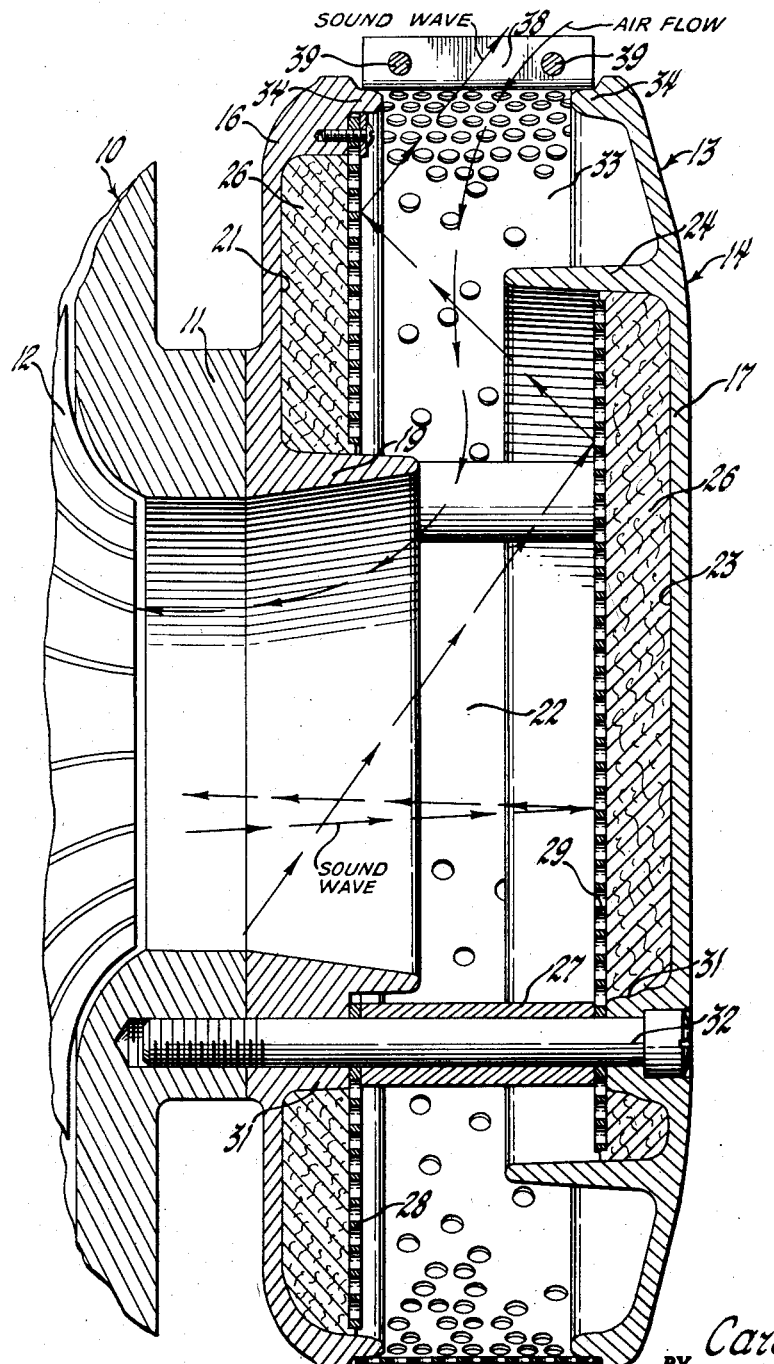
INVENTOR.
Carl S. Hoffman
BY
L. D. Burch
ATTORNEY United States Patent Office 2,869,670
Patented Jan. 20, 1959

2,869,670

INTAKE SILENCER

Carl S. Hoffman, Royal Oak, Mich., assignor to General Motors Corporation, Detroit, Mich., a corporation of Delaware Application October 1, 1956, Serial No. 613,134

1 Claim. (Cl. 181—35)

This invention relates to intake silencers for engines and has particular relation to an intake silencer especially applicable for use in diesel engines having turbo compressor means for supplying air for operating the engines.

It is proposed to provide an intake silencer for such purposes which will be economical to construct, which will require a small amount of space, which can be mounted on a turbo compressor inlet and which will effectively absorb and baffle the sound emanating from the engine through such inlet.

In the drawing:

The single figure of the drawing illustrates a fragmentary view of an engine having a turbo compressor inlet to which is secured an intake silencer embodying the principles of the invention.

The engine 10 may be a diesel or other suitable engine having an air inlet indicated at 11. In the present instance the engine is provided with a turbo compressor 12 which receives air from the inlet 11 to be compressed and supplied to the cylinders of the engine. The inlet 11 is adapted to be supplied with air by an intake silencer 13 formed by a casing 14 having inner and outer walls 16 and 17 respectively. Inner wall 16 is formed to provide a tubular outlet 19 communicating with the inlet 11 and around which an annular recess 21 is formed in the wall 16. The outer wall 17 is spaced from the inner wall 16 to provide an inlet chamber 22 which communicates with the outlet 19. The outer wall 17 has a depression 23 formed therein in directly opposed relation to the outlet 19 and extending radially outwardly beyond the outlet 19 where it overlaps the inner part of the recess 21. The wall 17 may also be formed to include a peripheral wall shield or baffle 24 surrounding the depression 23 and extending part of the way across the chamber 22 toward the recess 21. The recess and the depression may be filled with sound absorbing material indicated at 26. In order to be able to easily assemble the structure and to hold the sound absorbing material 26 in place it is proposed to employ tubular spacers 27 extending across the chamber 22 outwardly of the outlet 19. The opposite ends of the tubular spacers 27 are adapted to engage perforated plates 28 and 29 extending across the recess 21 and the depression 23 respectively and engaging the sound absorbing material therein and spacing lugs 31 formed inwardly of the walls 16 and 17 and within the recess 21 and depression 23, all respectively. The spacers 27, perforated plates 28 and 29 and casing walls 16 and 17 are all held together and assembled upon the engine 10 by fastening means in the form of studs 32 projecting through aligned openings in the parts referred to and being secured in threaded openings formed in the engine inlet 11. The walls 16 and 17 are spaced at the outer peripheral edges thereof to provide an inlet to the chamber 22 from the atmosphere surrounding the structure. The inlet may be covered by a perforated band 33 the edges of which engage shoulders 34 formed on the walls 16 and 17, the ends of the band being flanged at 38 and removably secured together by bolts 39. The chamber 22 and the atmospheric inlet leading thereto are large enough to supply air to the outlet 19 leading to the inlet 11 without objectionable restriction. The chamber also is large enough to permit the baffle 24 to extend a considerable distance across the chamber and toward the recess 21 without appreciably restricting the flow of air in this region. However, the baffle 24 is located in a position to provide a shield that will effectively prevent the sound waves emanating from the inlet from being reflected against the various parts and escaping to the atmosphere through the chamber inlet, without first being projected against the sound absorbing material 26 in both the recess 21 and the depression 23. The central part of the depression 23 directly opposite the outlet 19 will absorb sound waves projected outwardly from the outlet 19, will reflect the unabsorbed sound waves backwardly into the turbo compressor 11 or will reflect such waves obliquely outwardly against the sound absorbing material in the recess 21. Such sound waves as may not be absorbed within the turbo compressor or the recess 21 and depression 23 will not be objectionable when reflected around the baffle 24 and from the inlet leading to the chamber 22.

I claim:

An intake silencer for internal combustion engines and the like and comprising a casing having spaced inner and outer walls, said walls being axially spaced to provide an inlet chamber and an inlet, and having axially opposed circumferential shoulders by which a screen portion in the form of a perforated band may be engaged, said inner wall of said casing having an outlet and being axially depressed around said outlet and within said inner wall to provide an annular recess in said inner wall, said outlet forming an extension of the engine inlet to which the silencer is to be attached and having direct communication with said inlet chamber, said outer wall being formed to provide a depression extending across said outlet and overlapping said annular recess; spacing lugs formed inwardly within said depression and said inner wall respectively; spacers for coaction with said spacing lugs; threaded studs for rigidly clamping said inner and outer walls in the axial relation established by said spacers and coincidentally for fastening the silencer in place; sound absorbing material in opposed relation in said recess and in said depression for absorbing sound emanating from said outlet, said outer wall being formed radially inwardly of said shoulders to provide a peripheral baffle around said depression and extending toward said inner wall recess and partly across said inlet chamber for baffling sound emanating from said outlet, said inner and outer walls and said baffle being axially spaced, radially outwardly of said outlet, to provide a substantially unobstructed and radially inwardly directed passage from the atmosphere through said inlet and said inlet chamber and toward said outlet whereby a free diametral flow space is provided.

References Cited in the file of this patent

UNITED STATES PATENTS

| 425,637 | Shipman | Apr. 15, 1890 |
| 1,578,682 | Raymond | Mar. 30, 1926 |
| 1,934,463 | Hartsock | Nov. 7, 1933 |
| 2,323,955 | Wilson | July 13, 1943 |
| 2,564,814 | Perrin | Aug. 21, 1951 |

FOREIGN PATENTS

| 493,538 | Great Britain | 1938 |